United States Patent
Pepper et al.

(10) Patent No.: US 8,599,643 B2
(45) Date of Patent: Dec. 3, 2013

(54) JOINT STRUCTURAL DIP REMOVAL

(75) Inventors: Randolph E. F. Pepper, Beijing (CN); Philippe Paul Jacques Marza, Beijing (CN); Agnes Dubois, La Ferte Saint Cyr (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 446 days.

(21) Appl. No.: 12/844,052

(22) Filed: Jul. 27, 2010

(65) Prior Publication Data

US 2012/0026832 A1   Feb. 2, 2012

(51) Int. Cl.
  *G01V 1/28*   (2006.01)
  *G01V 1/30*   (2006.01)
  *G01V 11/00*   (2006.01)
(52) U.S. Cl.
  USPC .............. 367/38; 367/73; 702/11; 702/16
(58) Field of Classification Search
  USPC ............. 367/25, 38, 73; 702/11, 14, 16, 17
  See application file for complete search history.

(56) References Cited

U.S. PATENT DOCUMENTS

| | | | |
|---|---|---|---|
| 5,812,493 A | * | 9/1998 | Robein et al. ............... 367/73 |
| 2003/0055598 A1 | * | 3/2003 | Gillard et al. ............... 702/156 |
| 2011/0255370 A1 | * | 10/2011 | Hirabayashi et al. ......... 367/31 |

\* cited by examiner

*Primary Examiner* — Ian J Lobo
(74) *Attorney, Agent, or Firm* — Colin Wier; Rodney Warfford (57) ABSTRACT

A method for structural dip removal. The method includes converting a seismic volume to a depth domain, extracting seismic dips from the seismic volume in the depth domain along a borehole trajectory, analyzing a borehole using the seismic dips to obtain structural dip data, and in response to determining that the seismic dips and borehole dips obtained from borehole imagery are consistent, generating a three dimensional ("3D") structural model using the structural dip data. The method further includes performing a structural restoration using the 3D structural model to obtain depositional geometry data, removing structural dip from the borehole imagery using the 3D structural model to obtain sedimentary dip data, and performing a stratigraphic interpretation using the depositional geometry data and the sedimentary dip data.

20 Claims, 7 Drawing Sheets

JOINT STRUCTURAL DIP REMOVAL

BACKGROUND

Operations, such as surveying, drilling, wireline testing, completions, production, planning and field analysis, are typically performed to locate and gather valuable downhole fluids. Surveys are often performed using acquisition methodologies, such as seismic scanners or surveyors to generate maps of underground formations. These formations are often analyzed to determine the presence of subterranean assets, such as valuable fluids or minerals, or to determine whether the formations have characteristics suitable for storing fluids.

During drilling and production operations, data is typically collected for analysis and/or monitoring of the operations. Such data may include, for instance, information regarding subterranean formations, equipment, and historical and/or other data.

Data concerning the subterranean formation is collected using a variety of sources. Such formation data may be static or dynamic. Static data relates to, for instance, formation structure and geological stratigraphy that define geological structures of the subterranean formation. Dynamic data relates to, for instance, fluids flowing through the geologic structures of the subterranean formation over time. Such static and/or dynamic data may be collected to learn more about the formations and the valuable assets contained therein.

Various equipment may be positioned about the field to monitor field parameters, to manipulate the operations and/or to separate and direct fluids from the wells. Surface equipment and completion equipment may also be used to inject fluids into reservoirs, either for storage or at strategic points to enhance production of the reservoir.

Typically, borehole interpretation of dip is performed independently and offers high resolution interpretation of structural dip and, after dip removal, the interpretation of sedimentation. The interpretation may then be incorporated into the regional picture of the area. In this case, the selection of structural zones is very subjective and requires expert analysis. Further, the determination of the structural zones and the structural dip is not verified against the local geology.

SUMMARY

In one or more implementations of joint structural dip removal, the method includes converting a seismic volume to a depth domain, extracting seismic dips from the seismic volume in the depth domain along a borehole trajectory, analyzing a borehole using the seismic dips to obtain structural dip data, and in response to determining that the seismic dips and borehole dips obtained from borehole imagery are consistent, generating a three dimensional ("3D") structural model using the structural dip data. The method further includes performing a structural restoration using the 3D structural model to obtain depositional geometry data, removing structural dip from the borehole imagery using the 3D structural model to obtain sedimentary dip data, and performing a stratigraphic interpretation using the depositional geometry data and the sedimentary dip data.

Other aspects of joint structural dip removal will be apparent from the following description and the appended claims.

BRIEF DESCRIPTION OF THE DRAWINGS

The appended drawings illustrate several embodiments of joint structural dip removal and are not to be considered limiting of its scope, for joint structural dip removal may admit to other equally effective embodiments.

FIGS. 4.1, 4.2 and 4.3 depict example dip data for joint structural dip removal in accordance with one or more embodiments.

DETAILED DESCRIPTION

Embodiments are shown in the above-identified drawings and described below. In describing the embodiments, like or identical reference numerals are used to identify common or similar elements. The drawings are not necessarily to scale and certain features and certain views of the drawings may be shown exaggerated in scale or in schematic in the interest of clarity and conciseness.

Figure 1:
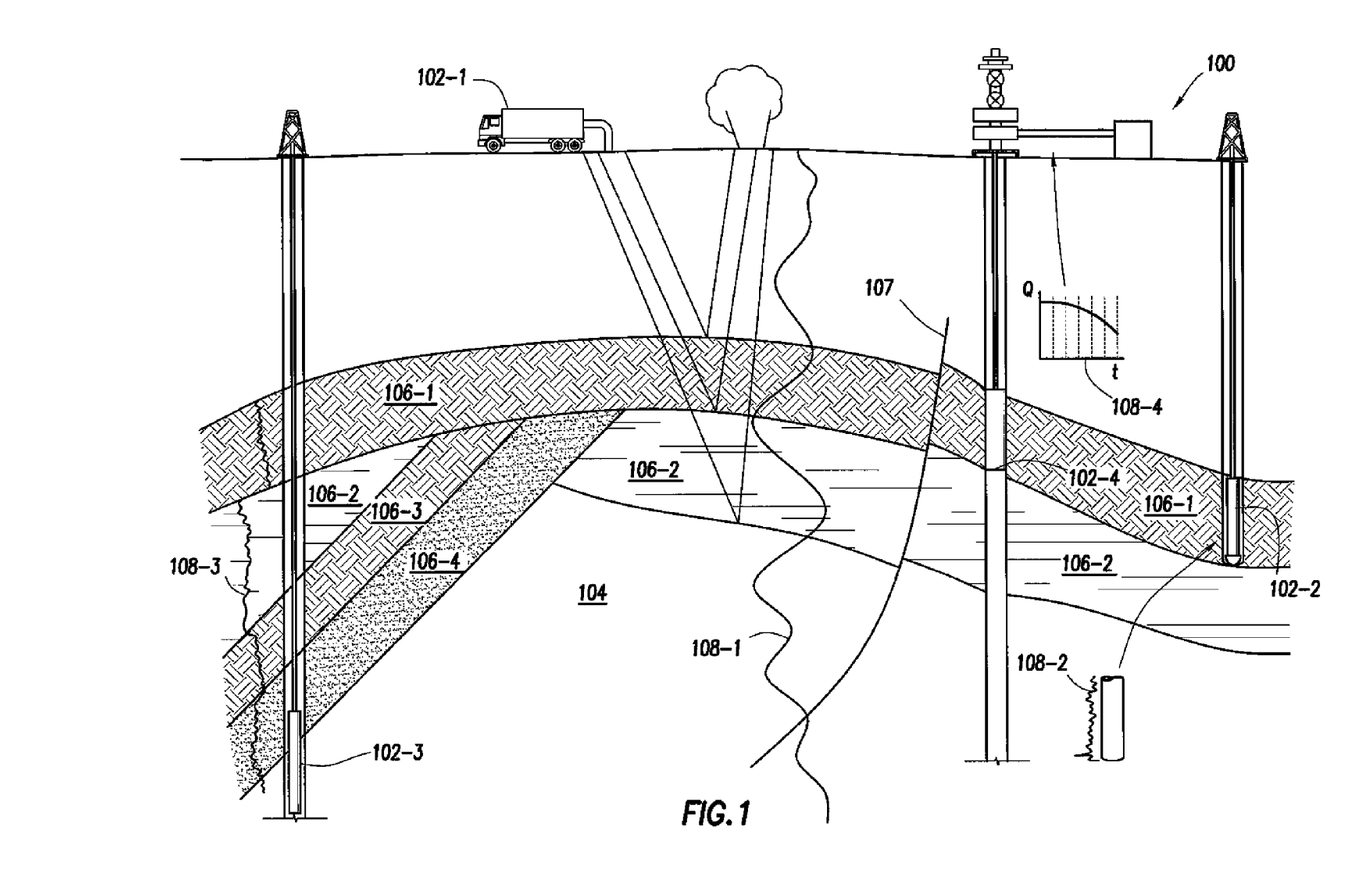
FIG. 1 depicts a schematic view, partially in cross-section, of a field having a plurality of data acquisition tools positioned at various locations along the field for collecting data from the subterranean formation, in which embodiments of joint structural dip removal may be implemented.

FIG. 1 depicts a schematic view, partially in cross section of a field (100) having data acquisition tools (102-1), (102-2), (102-3), and (102-4) positioned at various locations in the field for gathering data of a subterranean formation (104). As shown, the data collected from the tools (102-1 through 102-4) can be used to generate data plots (108-1 through 108-4), respectively.

As shown in FIG. 1, the subterranean formation (104) includes several geological structures (106-1 through 106-4). As shown, the formation has a sandstone layer (106-1), a limestone layer (106-2), a shale layer (106-3), and a sand layer (106-4). A fault line (107) extends through the formation. In one or more embodiments, the static data acquisition tools are adapted to measure the formation and detect the characteristics of the geological structures of the formation.

As shown in FIG. 1, a drilling operation is depicted as being performed by drilling tools (102-2) suspended by a rig (101) and advanced into the subterranean formations (104) to form a wellbore (103). The drilling tools (106b) may be adapted for measuring downhole properties using logging-while-drilling ("LWD") tools.

A surface unit (now shown) is used to communicate with the drilling tools (102-2) and/or offsite operations. The surface unit is capable of communicating with the drilling tools (102-2) to send commands to the drilling tools (102-2), and to receive data therefrom. The surface unit is preferably provided with computer facilities for receiving, storing, processing, and/or analyzing data from the oilfield. The surface unit collects data generated during the drilling operation and produces data output which may be stored or transmitted. Computer facilities, such as those of the surface unit, may be positioned at various locations about the oilfield and/or at remote locations.

Sensors, such as gauges, may be positioned about the oilfield to collect data relating to various oilfield operations as described previously. For example, the sensor may be positioned in one or more locations in the drilling tools (102-2) and/or at the rig (101) to measure drilling parameters, such as weight on bit, torque on bit, pressures, temperatures, flow rates, compositions, rotary speed and/or other parameters of the oilfield operation.

The data gathered by the sensors may be collected by the surface unit and/or other data collection sources for analysis or other processing. The data collected by the sensors may be used alone or in combination with other data. The data may be collected in one or more databases and/or transmitted on or offsite. All or select portions of the data may be selectively used for analyzing and/or predicting oilfield operations of the current and/or other wellbores. The data may be may be historical data, real time data or combinations thereof. The real time data may be used in real time, or stored for later use. The data may also be combined with historical data or other inputs for further analysis. The data may be stored in separate databases, or combined into a single database.

The collected data may be used to perform activities, such as wellbore steering. In another example, the seismic data output may be used to perform geological, geophysical, and/or reservoir engineering. In this example, the reservoir, wellbore, surface and/or process data may be used to perform reservoir, wellbore, geological, and geophysical or other simulations. The data outputs from the oilfield operation may be generated directly from the sensors, or after some preprocessing or modeling. These data outputs may act as inputs for further analysis.

As shown in FIG. 1, data plots (108-1 through 108-4) are examples of plots of static properties that may be generated by the data acquisition tools (102-1 through 102-4), respectively. For example, data plot (108-1) is a seismic two-way response time. In another example, data plot (108-2) is core sample data measured from a core sample of the formation (104). In another example, data plot (108-3) is a logging trace. In another example, data plot (108-4) is a plot of a dynamic property, the fluid flow rate over time. Those skilled in the art will appreciate that other data may also be collected, such as, but not limited to, borehole imagery, historical data, user inputs, economic information, other measurement data, and other parameters of interest.

While a specific subterranean formation (104) with specific geological structures is depicted, it will be appreciated that the formation may contain a variety of geological structures. Fluid, rock, water, oil, gas, and other geomaterials may also be present in various portions of the formation. Each of the measurement devices may be used to measure properties of the formation and/or its underlying structures. While each acquisition tool is shown as being in specific locations along the formation, it will be appreciated that one or more types of measurement may be taken at one or more location across one or more fields or other locations for comparison and/or analysis using one or more acquisition tools. The terms measurement device, measurement tool, acquisition tool, and/or field tools are used interchangeably in this documents based on the context.

The data collected from various sources, such as the data acquisition tools of FIG. 1, may then be evaluated. Typically, seismic data displayed in the data plot (108-1) from the data acquisition tool (102-1) is used by a geophysicist to determine characteristics of the subterranean formation (104). Core data shown in plot (108-2) and/or log data from the well log (108-3) is typically used by a geologist to determine various characteristics of the geological structures of the subterranean formation (104). Production data from the production graph (108-4) is typically used by the reservoir engineer to determine fluid flow reservoir characteristics.

Figure 2:
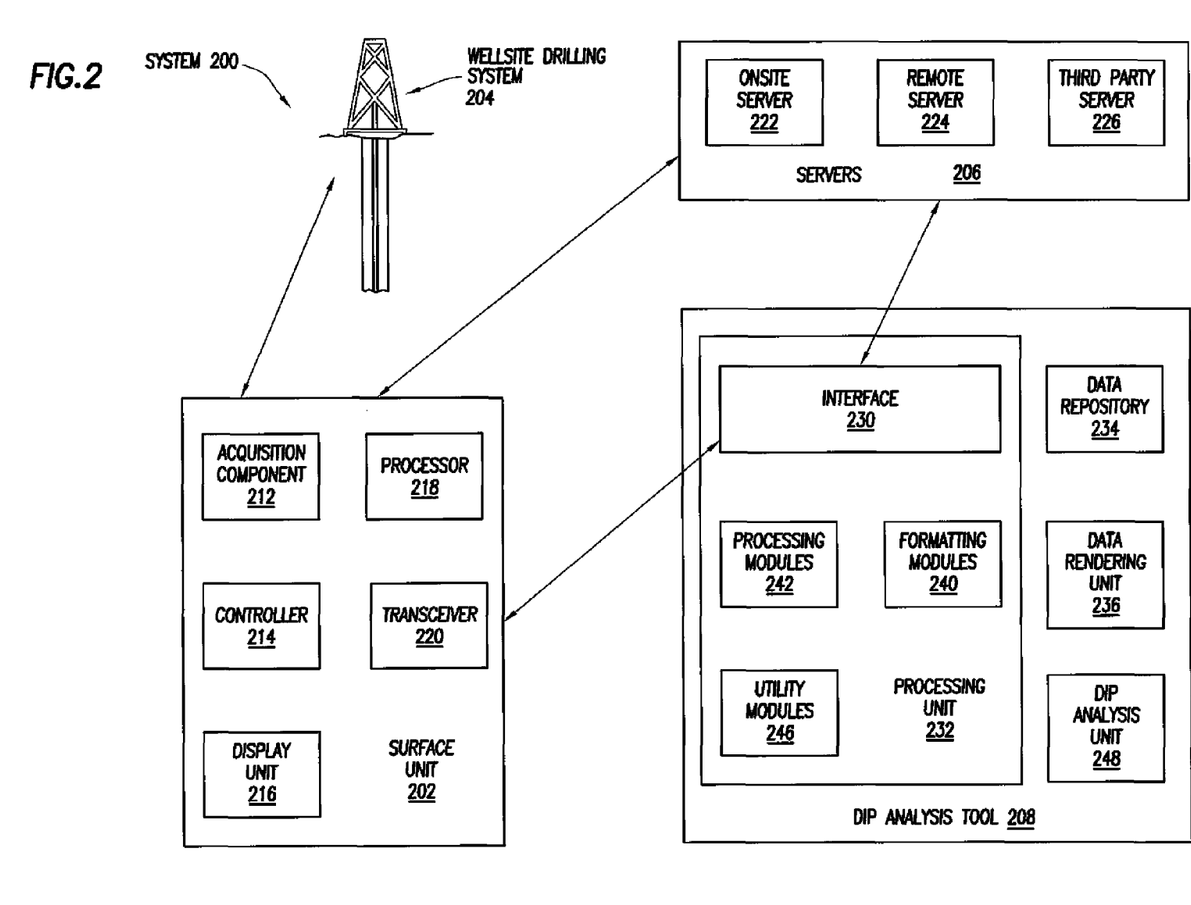
FIG. 2 depicts a system in which one or more embodiments of joint structural dip removal may be implemented.

FIG. 2 depicts a system (200) incorporated with a portion of a field, as shown and described above with reference to FIG. 1. As shown, the system (200) includes a surface unit (202) operatively connected to a wellsite drilling system (204), servers (206), and a dip analysis tool (208) via an interface (230) on the dip analysis tool (208). The dip analysis tool (208) is also operatively linked, via the interface (230), to the servers (206). The surface unit (202) and wellsite drilling system (204) may include various field tools and wellsite facilities. As shown, communication links are provided between the surface unit (202) and the wellsite drilling system (204), servers (206), and dip analysis tool (208). A communication link is also provided between the dip analysis tool (208) and the servers (206). A variety of links may be provided to facilitate the flow of data through the system (200). For example, the communication links may provide for continuous, intermittent, one-way, two-way and/or selective communication throughout the system (200). The communication links may be of any type, including but not limited to wired and wireless.

In one or more embodiments, the wellsite drilling system (204) is configured to perform oilfield operations as described above with reference to FIG. 1. Specifically, the wellsite drilling system (204) may be configured to perform drilling operations as directed by a surface unit (202). In one or more embodiments, the surface unit (202) is provided with an acquisition component (212), a controller (214), a display unit (216), a processor (218), and a transceiver (220). The acquisition component (212) collects and/or stores data of the field. This data may be measured by sensors at the wellsite. This data may also be received from other sources, such as those described with reference to FIG. 1 above.

The controller (214) may be enabled to enact commands at the field. The controller (214) may be provided with actuation means that can perform drilling operations, such as steering, advancing, or otherwise taking action at the wellsite. Commands may be generated based on logic of the processor (218), or by commands received from other sources. In one or more embodiments, the processor (218) is provided with features for manipulating and analyzing the data. The processor (218) may be provided with additional functionality to perform field operations.

In one or more embodiments, a display unit (216) may be provided at the wellsite and/or remote locations for viewing field data (not shown). The field data represented by the display unit (216) may be raw data, processed data and/or data outputs generated from various data. In one or more embodiments, the display unit (216) is adapted to provide flexible views of the data, so that the screens depicted may be customized as desired. A user may plan, adjust, and/or otherwise perform field operations (e.g., determine the desired course of action during field operations) based on reviewing the displayed field data. The field operations may be selectively adjusted in response to viewing the data on the display unit (216). The display unit (216) may include a two-dimensional (2D) display or a three-dimensional (2D) display for viewing field data or various aspects of the field operations.

In one or more embodiments, the transceiver (220) provides a means for providing data access to and/or from other sources. The transceiver (220) may also provide a means for communicating with other components, such as the servers (206), the wellsite drilling system (204), the surface unit (202), and/or the dip analysis tool (208).

The servers (206) may be configured to transfer data from a surface unit (202) at one or more wellsites to the dip analysis tool (208). As shown, the servers (206) include an onsite server (222), a remote server (224), and a third party server (226). The onsite server (222) may be positioned at the wellsite and/or other locations for distributing data from the surface unit (202). As shown, the remote server (224) is positioned at a location away from the field and provides data from remote sources. The third party server (226) may be onsite or remote, but is often operated by a third party, such as a client.

In one or more embodiments, the servers (206) are capable of transferring data, such as logs, drilling events, trajectory, seismic data, borehole imagery, historical data, economics data, other field data, and/or other data that may be of use during analysis. The type of server is not intended to limit joint structural dip removal. In one or more embodiments, the system is adapted to function with any type of server that may be employed.

In one or more embodiments, the servers (206) communicate with the dip analysis tool (208) through the communication links. As indicated by the multiple arrows, the servers (206) may have separate communication links with the dip analysis tool (208) and the surface unit (202). One or more of the servers (206) may be combined or linked to provide a combined communication link.

In one or more embodiments, the servers (206) collect a wide variety of data. The data may be collected from a variety of channels that provide a certain type of data, such as well logs. The data from the servers is passed to the dip analysis tool (208) for processing. The servers (206) may also be configured to store and/or transfer data. For example, the data may be collected at the wellsite drilling system (204) using measurements-while-drilling (MWD) tools, logging-while-drilling (LWD) tools, any other similar types of drilling measurement tools, or any combination thereof. More specifically, the MWD tools and/or LWD tools may be configured to obtain seismic data during drilling of the borehole at the wellsite drilling system (204). The LWD tool may also be configured to obtain borehole imagery during drilling of the borehole.

Those skilled in the art will appreciate that MWD tools are configured to evaluate physical properties during the drilling of a wellbore. A MWD tool may obtain measurements downhole, which may be stored and then transmitted to the surface. In this case, the measurements may be transmitting to the surface as pressure pulses in the mud system (e.g., positive, negative, or continuous sine waves). One skilled in the art will appreciate that MWD tools that measure formation parameters (resistivity, porosity, sonic velocity, gamma ray) are referred to as LWD tools. LWD tools may obtain, store, and transmit measurements as discussed above with reference to MWD tools.

In one or more embodiments, the dip analysis tool (208) is operatively linked to the surface unit (202) for receiving data therefrom. In some cases, the dip analysis tool (208) and/or server(s) (206) may be positioned at the wellsite. The dip analysis tool (208) and/or server(s) (206) may also be positioned at various locations. The dip analysis tool (208) may be operatively linked to the surface unit (202) via the server(s) (206). The dip analysis tool (208) may also be included in or located near the surface unit (202).

In one or more embodiments, the dip analysis tool (208) includes an interface (230), a processing unit (232), a data repository (234), and a data rendering unit (236). In one or more embodiments, the dip analysis unit (248) of the dip analysis tool (208) is configured to monitor downhole properties for borehole steering. More specifically, the dip analysis unit (248) may be configured to use downhole properties obtained by MWD tools and/or LWD tools at the wellsite drilling system (204) to perform a stratigraphic interpretation. In this case, the downhole properties may be obtained from the servers (206), where the wellsite drilling system (204) and surface unit (202) are configured to store the downhole properties in the servers (206) in real time.

In one or more embodiments, the dip analysis unit (248) is configured to perform a joint dip analysis based on seismic data and borehole imagery. More specifically, the dip analysis unit (248) may be configured to determine whether seismic dips obtained from seismic data are consistent with borehole dips obtained from borehole imagery. In this case, the dip analysis unit (248) may be further configured to construct a three dimensional ("3D") structural model based on the seismic dips when the seismic dips and borehole dips are consistent. The consistency determination may account for multiple scales, where the seismic data is at a larger scale (e.g., tens of meters) and the borehole imagery is at a smaller scale (e.g., sub-meter). Examples of dip data is described below with reference to FIGS. 4.1, 4.2 and 4.3.

In one or more embodiments, the dip analysis unit (248) is configured to determine whether seismic dips and borehole dips are consistent by (1) verifying the accuracy of a portion of the seismic dips along the borehole trajectory using the borehole dips and/or (2) ensuring that the seismic dips are consistent with a structural dip zonation generated based on the borehole dips. In this case, the dip analysis unit (248) may be configured to group borehole dips based on common properties to determine structural dip zones along the borehole. Further, the dip analysis unit (248) may be configured to use the seismic dips to determine structural boundaries, which are then compared to the structural dip zones for consistency.

In one or more embodiments, the dip analysis unit (248) may be configured to generate an optimal well trajectory based on the stratigraphic interpretation. For example, the dip analysis unit (248) may generate an optimal well trajectory to steer a drilling operation to a target area. In this example, the dip analysis unit (248) may determine that a reservoir is positioned in a geological layer based on sedimentary dip information obtained from the stratigraphic interpretation. The optimal well trajectory determined by the dip analysis unit (248) may then be used at the surface unit (202) to adjust the drilling operation. In this case, the dip analysis unit (248) may be configured to provide real time feedback, including an optimal well trajectory generated based on an analysis of the seismic data and borehole imagery, to the surface unit (202), where a drilling operation may be adjusted at the surface unit (202) accordingly.

Optionally, the dip analysis unit (248) may be configured to continually update an earth model (e.g., a full field numerical model, a geostatistical model, etc.) based on the stratigraphic interpretation. In this case, the dip analysis unit (248) may be configured to generate the optimal well trajectory using the updated earth model. Further, the earth model may initially be generated based on subsurface measurements as described above with reference to FIG. 1.

In one or more embodiments, the interface (230) of the dip analysis tool (208) is configured to communicate with the servers (206) and the surface unit (202). The interface (230) may also be configured to communicate with other oilfield or non-oilfield sources. The interface (230) may be configured to receive the data and map the data for processing. In one or more embodiments, data from the servers (206) is sent along predefined channels, which may be selected by the interface (230).

As depicted in FIG. 2.2, the interface (230) selects the data channel of the server(s) (206) and receives the data. In one or more embodiments, the interface (230) also maps the data channels to data from the wellsite. The data may then be passed from the interface (230) to the processing modules (242) of the processing unit (232). In one or more embodiments, the data is immediately incorporated into the dip analysis tool (208) for real time sessions and/or modeling. The interface (230) may create data requests (e.g., surveys, logs, MWD/LWD data, etc.), display the user interface, and monitor connection state events. In one or more embodiments, the interface (230) also instantiates the data into a data object for processing.

In one or more embodiments, the processing unit (232) includes formatting modules (240), processing modules (242), and utility modules (246). These modules are configured to manipulate the field data for analysis, potentially in real time.

In one or more embodiments, the formatting modules (240) transform the data to a desired format for processing. Incoming data may be formatted, translated, converted, or otherwise manipulated for use. In one or more embodiments, the formatting modules (240) are configured to enable the data from a variety of sources to be formatted and used so that the data processes and displays in real time.

In one or more embodiments, the utility modules (246) provide support functions to the dip analysis tool (208). In one or more embodiments, the utility modules (246) include a logging component (not shown) and a user interface (UI) manager component (not shown). The logging component provides a common call for the logging data, which means that the utility modules (246) allow the logging destination to be set by the application. The logging component may also be provided with other features, such as a debugger, a messenger, and a warning system, among others. The debugger sends a debug message to those using the system. The messenger sends information to subsystems, users, and others. The information sent by the messenger may or may not interrupt the operation and may be distributed to various locations and/or users throughout the system. The warning system may be configured to send error messages and warnings to various locations and/or users throughout the system. In some cases, the warning messages may interrupt the process and display alerts.

In one or more embodiments, the UI manager component (not shown) creates user interface elements for displays. The UI manager component defines user input screens, such as menu items, context menus, toolbars, and settings windows. The UI manager may also be configured to direct events relating to these user input screens.

In one or more embodiments, the processing modules (242) are configured to analyze the data and generate outputs. As described above, the data analyzed by the processing modules (242) may include static data, dynamic data, historic data, real time data, or other types of data. Further, the data analyzed by the processing modules (242) may relate to various aspects of the field operations, such as formation structure, geological stratigraphy, core sampling, well logging, density, resistivity, fluid composition, flow rate, downhole condition, surface condition, equipment condition, or other aspects of the field operations. In one or more embodiments, the data is processed by the processing module (242) into multiple volume data sets for storage and retrieval.

In one or more embodiments, the data repository (234) stores the data for the dip analysis tool (208). The data stored in the data repository (234) may be in a format available for use in real time (e.g., information is updated at approximately the same rate that the information is received). In one or more embodiments, the data is passed to the data repository (234) from the processing modules (242). The data can be persisted in the file system (e.g., as an extensible markup language (XML) file such as the Digital Log Interchange Standard (DLIS), as an image file in the SEG-Y format, etc.) or in a database. The user, a computer program, or some other determining entity may determine which storage is the most appropriate to use for a given piece of data and stores the data in a manner to enable automatic flow of the data through the rest of the system in a seamless and integrated fashion. The system may also facilitate manual and automated workflows (e.g., Modeling, Geological, and Geophysical workflows) based upon the persisted data.

In one or more embodiments, the data rendering unit (236) performs rendering algorithm calculations to provide one or more displays for visualizing the data. The displays for visualizing the data may be presented, using one or more communication links, to a user at the display unit (216) of the surface unit (202). The data rendering unit (236) may contain a 2D canvas, a 3D canvas, a well section canvas, or other canvases, either by default or as selected by a user. The data rendering unit (236) may selectively provide displays composed of any combination of one or more canvases. The canvases may or may not be synchronized with each other during display. In one or more embodiments, the data rendering unit (236) is provided with mechanisms for actuating various canvases or other functions in the system. Further, the data rendering unit (236) may selectively provide displays composed of any combination of one or more volume data sets. The volume data sets typically contain exploration and production data.

While specific components are depicted and/or described for use in the units and/or modules of the dip analysis tool (208), it will be appreciated that a variety of components with various functions may be configured to provide the formatting, processing, utility, and coordination functions necessary to process data in the dip analysis tool (208). The components may have combined functionalities and may be implemented as software, hardware, firmware, or suitable combinations thereof.

Further, components (e.g., the processing modules (242), the data rendering unit (236), etc.) of the dip analysis tool (208) may be located in an onsite server (222) or in distributed locations where a remote server (224) and/or a third party server (226) may be involved. The onsite server (222) may be located within the surface unit (202).

Figure 3:
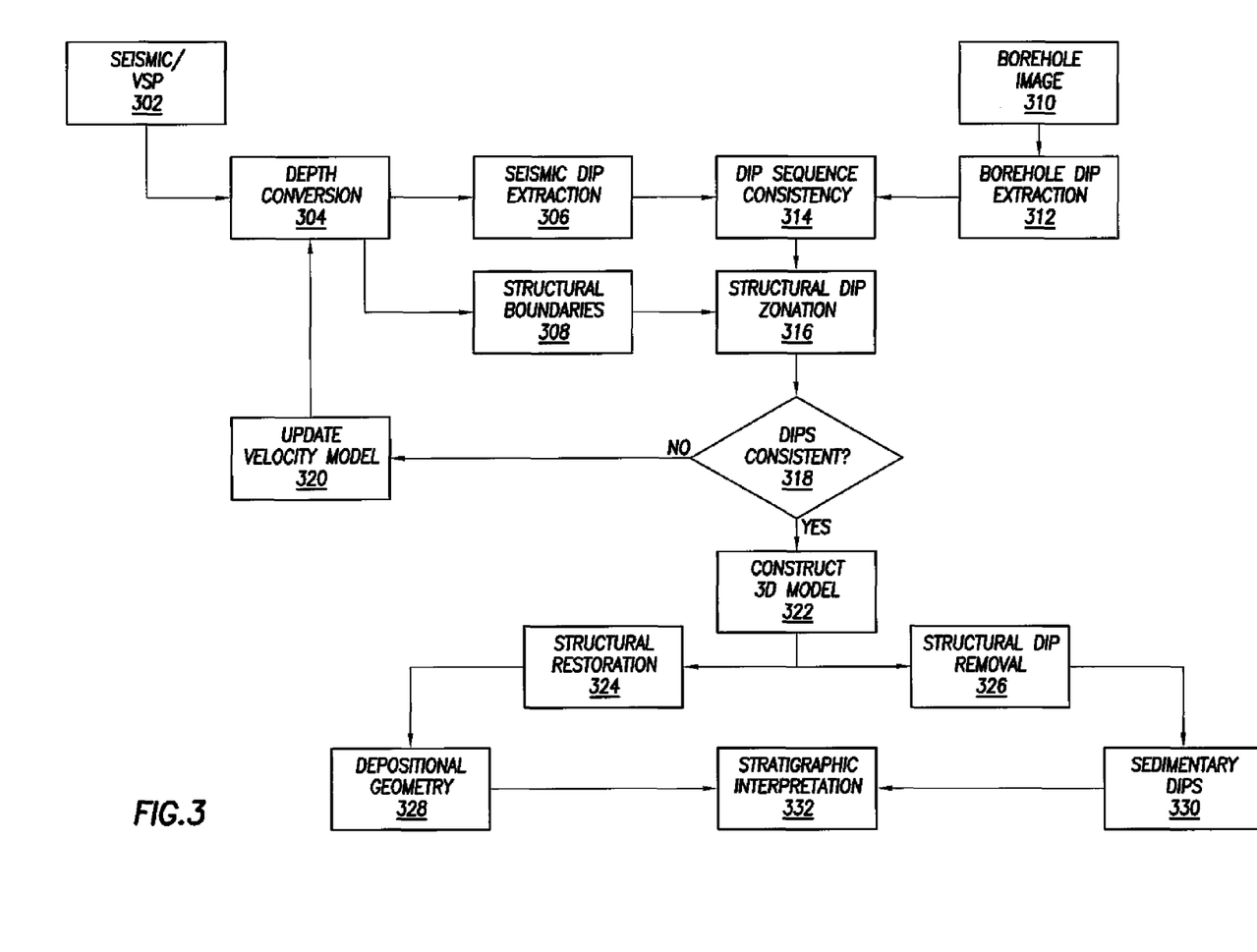
FIG. 3 depicts an example method for joint structural dip removal in accordance with one or more embodiments.

FIG. 3 depicts a flowchart of a method in accordance with one or more embodiments. One or more of the blocks shown in FIG. 3 may be omitted, repeated, and/or performed in a different order. Accordingly, embodiments should not be considered limited to the specific arrangements of blocks shown in FIG. 3.

In one or more embodiments, the method depicted in FIG. 3 may be practiced by a system as described above with reference to FIGS. 1-2. In block 302, seismic data is obtained. For example, the seismic data may be surface seismic data and/or a vertical seismic profile ("VSP") data. In this example, the VSP data may obtained by obtaining measurements made in a wellbore using geophones inside the wellbore and a seismic source at the surface near the well. Those skilled in the art will appreciate that the term "seismic data" may refer to raw data, processed data, and/or data outputs generated from various data.

In block 304, the seismic data is converted to a depth domain. Specifically, the seismic data may be converted using a velocity model to convert wave travel times to depth information. Once in the depth domain, the seismic data may provide geological characteristics such as, but not limited to, the depth and thickness of subsurface layers. In one or more embodiments, the seismic data in the depth domain may be a three-dimensional ("3D") seismic volume of the subsurface.

In block 306, seismic dips are extracted from the seismic data. More specifically, the seismic dips are derived from volume attribute processing (i.e., local orientation estimators) or from measurements on extracted surfaces from the seismic data in the vicinity of a borehole. For example, one surface method for obtaining seismic dips is to extract surfaces from all extrema (i.e., max/min deflection points) within the volume of interest, where best-fit planes may then be used to extract the dip/azimuth from the vicinity of the borehole. In this example, a pseudo-well may be used to extract seismic dips from the seismic data for scenarios involving proposed wells.

In block 308, structural boundaries of the subsurface may be determined based on the seismic data. For example, the structural boundaries may be determined using the seismic dips extracted from the seismic data. In this example, changes in dip between structural boundaries may be indicative of a change in paleo-structural deformation and may be an appropriate location to separate structural zones.

In block 310, borehole imagery is obtained. More specifically, borehole imagery may be logged from the borehole, providing detailed characteristics of the subsurface along the borehole. Examples of tools for obtaining borehole imagery include, but are not limited to, a formation microimager (FMI) borehole imaging tool, an ultrasonic imaging tool (USIT), azimuthal laterolog resistivity, logging while drilling at bit (LWD-RAB), etc.

In block 312, borehole dips are extracted from the borehole imagery. Specifically, the detailed characteristics of the borehole imagery may be analyzed to obtain the borehole dips from identified geological features of the subsurface.

In block 314, the seismic dips and borehole dips are verified for dip sequence consistency. For example, the seismic dips and borehole dips may be verified by (1) filtering the dips based on a dip sequence consistency (e.g. removal of outliers, filtering by dip classification methods (types of dip events such as fractures, bedding style), etc.), which allows for recognition of regional versus local structural trends, (2) extracting the dip information relevant for a structural dip computation (e.g., recognition of changes in structure due to different paled-deformation events), and (3) defining constant structural dip zones based on interactions between tadpole plots and a stereo-net display of the dip information. In this example, the seismic dips and borehole dips may be determined to be consistent at a number of particular depth points (i.e., the corresponding seismic dip and borehole dip at a particular depth are consistent). Examples of tadpole plots and a stereo-net display are discussed with reference to FIGS. 4.1, 4.2 and 4.3 below. Further, in this example, seismic dips may improve the determination of the different paleo-deformation events and, thus, assure consistent zones for borehole and the structural dip computation. The joint analysis of the tadpole plot and stereo-net using both borehole and seismic dips enable a consistent structural dip computation at the regional (i.e., seismic) scale. Thus, borehole dips may further be refined into sub-zones for local structural computation, which is still consistent at the regional zone scale.

In block 316, a structural dip zonation is generated based on the borehole dips with the further constraint provided by the seismic dips extracted from the structural boundaries as discussed above. Specifically, the borehole dips are grouped based on common dip characteristics (e.g., bedding orientation) to generate structural dip zones. In this case, the structural dip zonation may be used to define a succession of a constant plane dip zone or a constant fold axis dip zone, where both honor key structural boundaries and regional structure.

In block 318, a determination is made as to whether the seismic dips and borehole dips are consistent. The determination may be made based on the analysis performed above in reference to block 314 and/or block 316. Those skilled in the art will appreciate that the consistency determination may account for dip data of different scales. For example, the borehole dips may be generated from borehole imagery of local seismic trace estimates (i.e., from a local imaging aperture), and the seismic dips may be generated from local seismics of a controlled surface orientation (i.e., regional trends), where each has a different scale of investigation. In this example, the interpretation of structural zones is one source for determining inconsistencies between the independent dip measurements from the borehole imagery and local seismics. More specifically, the interaction with the tadpole plots and stereo-net displays are performed interactively to define the best estimates of zone boundaries for dip consistency.

If it is determined that the seismic dips and borehole dips are inconsistent, the velocity model used to perform the depth conversion may be updated (block 320). In this case, blocks 304-318 may be repeated using the new velocity model until the seismic dips and borehole dips are consistent. Those skilled in the art will appreciate that the velocity model describes vertical and horizontal seismic velocity for performing the depth conversion of block 304. Further, seismic velocity is typically calculated by using common midpoint data of seismic waves.

If it is determined that the seismic dips and borehole dips are consistent, a 3D structural model may be constructed (block 322). More specifically, the seismic dips and/or seismic data may be used to construct the 3D structural model, where the borehole dips and/or borehole imagery are used as control points to verify the seismic interpretations. In this case, because the seismic dips are consistent with the borehole dips, the dip information included in the 3D structural model should more accurately portray dip changes in the subsurface, which are indicative of key structural boundaries.

In block 324, a structural restoration of the seismic data is performed. More specifically, the seismic dips may be used to restore each of the geological layers in the subsurface from the present day geometry to its original depositional geometry (block 328). For example, a structural restoration may be performed successively by: (1) un-tilting the top unconformity structural dip, (2) un-tilting the fold axis, and (3) successive steps of unfolding. In this example, as each geological layer is removed, the remaining geological layers may be decompacted based on the removal of the load associated with the removed geological layer. The depositional geometry may describe geological layers as originally deposited, which may be used to determine the type of deposit of each geological layer (e.g., ocean deposit, river deposit, etc.). Further, the structural restoration may be performed in conjunction with a structural dip removal, where the restoration of each geological layer may be verified against the same structural dip removal steps applied to the seismic and borehole dips.

In block 326, a structural dip removal of the borehole imagery is performed. As discussed above, the structural dip removal applied to the seismic and borehole dips may be performed iteratively, following the structural restoration one geologic time step at a time, to remove the deformation within the most recent geologic deformation phase. In this case, the structural dip removal may work backward in geologic time to reconstruct the paleo-tectonic history of the volume of interest. The sedimentary dips of the area of interest are obtained once the seismic and/or borehole dips have been removed from the borehole imagery (block 330). Sedimentary dip may describe the direction and angle of the bedding independent of structural features (e.g., faulting, folding) that occurred subsequent to the original deposit of the geological layers.

In block 332, the depositional geometry and sedimentary dips may be used to perform a joint stratigraphic interpretation. More specifically, the depositional geometry and sedimentary dips may describe the history, composition, relative ages and distribution of strata, and the interpretation of strata in the subsurface, where the interpretation of the strata may be used determine geological properties of the subsurface. For example, the depositional geometry of each geological layer may be forward modeled to the present day state, where the sedimentary dips may be used to calibrate the model of the present day model. In this example, the stratigraphic interpretation may be used to identify the position of a target reservoir in the subsurface for a drilling operation. In another example, the depositional geometry and sedimentary dips may be used to generate a more accurate production forecast for optimizing a production operation.

Those skilled in the art will appreciate that blocks 302-332 may be repeated any number of times during an oilfield operation. In this case, the oilfield operation may be continually adjusted in real time based on successive stratigraphic interpretations of the subsurface.

Figure 41:
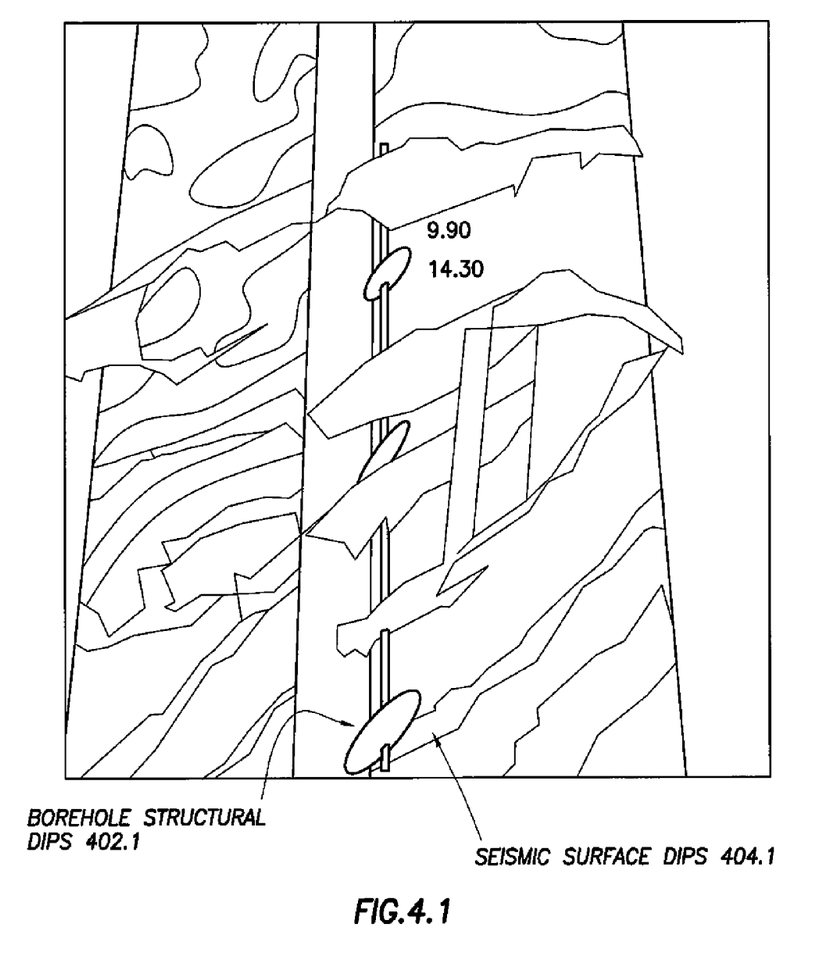
Figure 42:
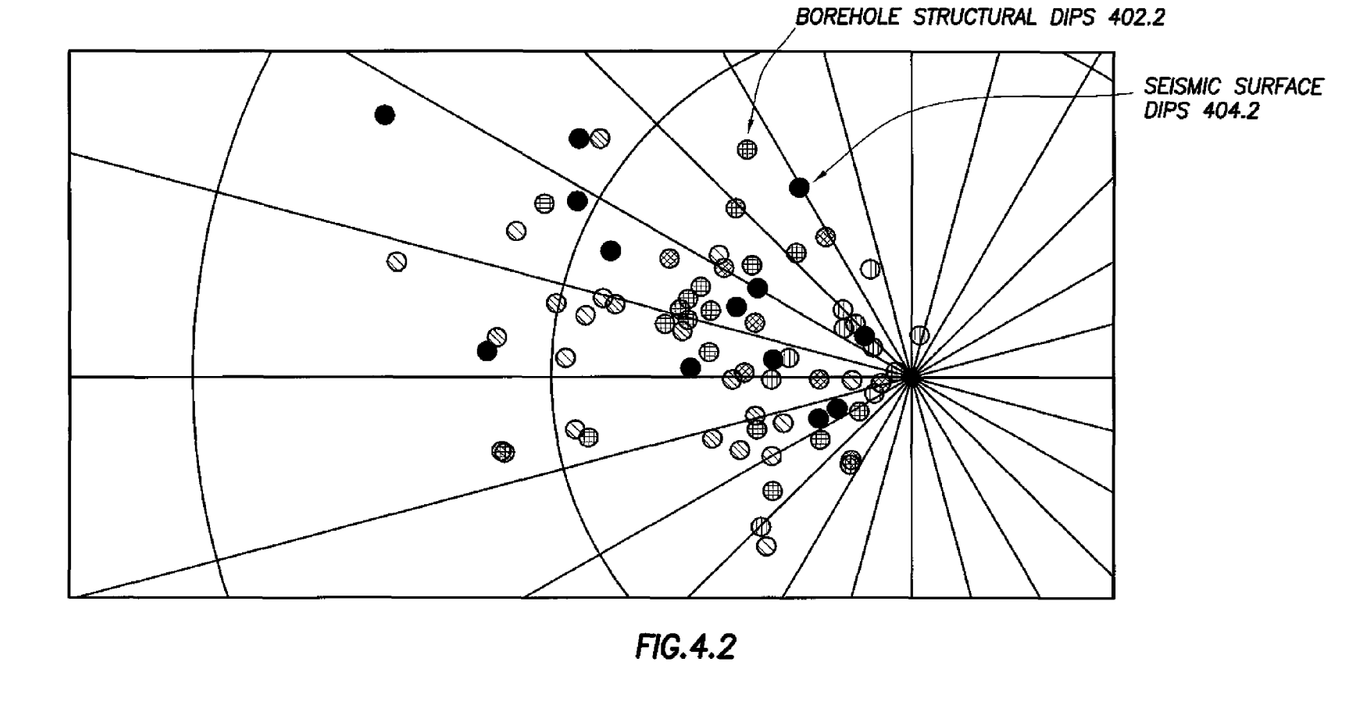
Figure 43:
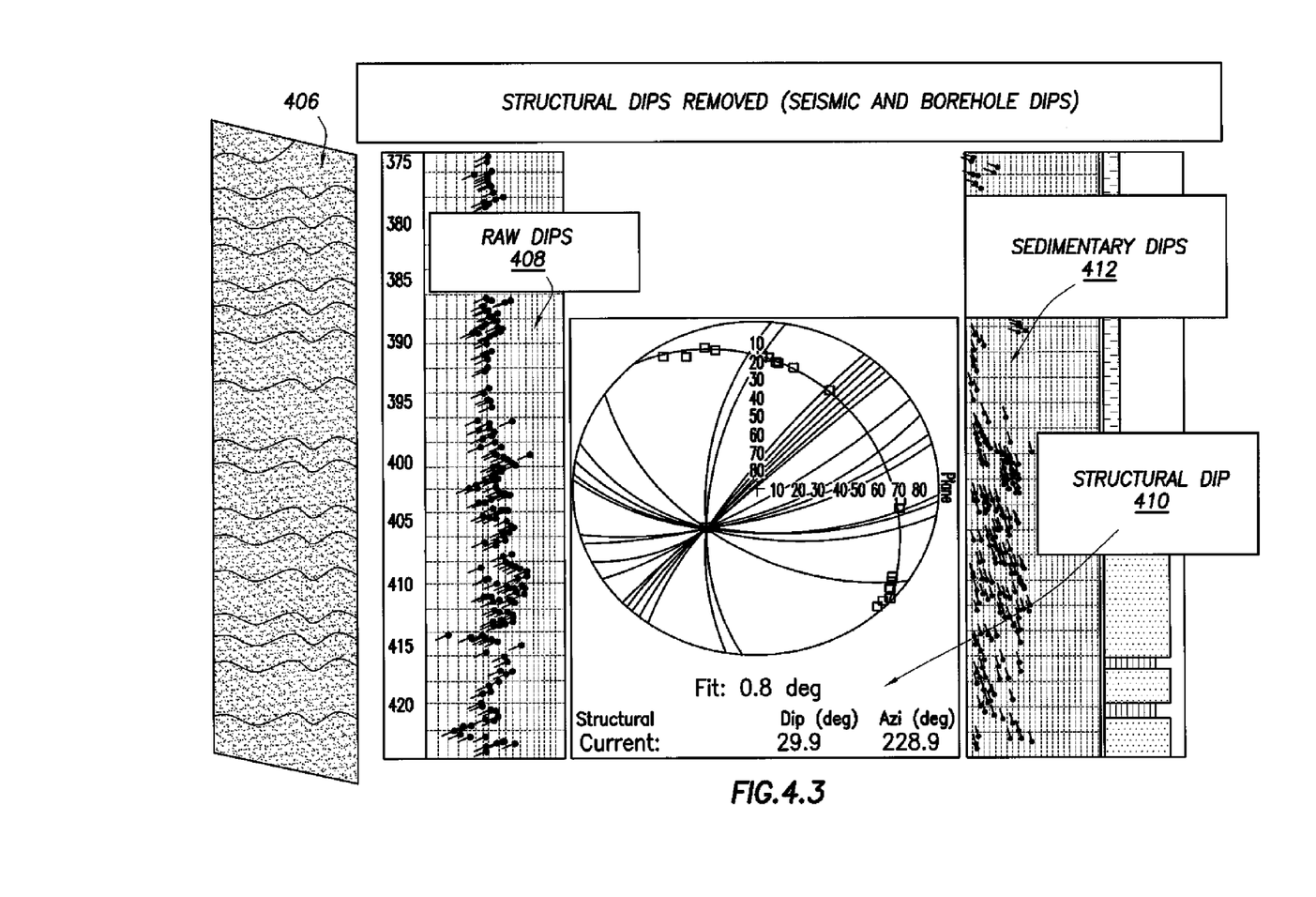

FIGS. 4.1-4.3 depict example dip data for joint structural dip removal. FIG. 4.1 depicts an original seismic volume including structural information. In this example, the seismic volume includes the extrema used to extract the surfaces. The visualization window includes both borehole structural dips (402.1) along the borehole trajectory and seismic surface dips (404.1) of the extrema surfaces, which intersect the borehole trajectory. Seismic dips may be extracted along the intersection path with the borehole trajectory.

FIG. 4.2 depicts a stereo-net display of dip data. The stereo-net display provides a representation of the orientation of bedding and the approximate dip angle of both borehole structural dips (402.2) and seismic surface dips (404.2). Similar to FIG. 4.1, FIG. 4.2 includes the structural dip information that may be extracted as described above with reference to FIG. 3.

FIG. 4.3 depicts the results of structural dip removal and structural restoration. The determined structural dip for a zone has been removed from the seismic volume using structural restoration methods (406). Further, the original, raw, borehole measured dips (408) are processed to remove the same structural dip per zone as removed in the structural restoration to the seismic volume and surfaces. The stereo-net (410) may display selected dips from the raw dip data (408) and the seismic dips (404.2 of FIG. 4.2) for the determination of the structural zone extents and the structural dip value for the zone. The sedimentary dips (412) are the result of performing a structural dip removal from the raw dips (408). The remaining dip variation on the sedimentary dips (412) is used for stratigraphic analysis, which is now consistent with the seismic volume and structurally restored surfaces as the structural dip has been removed jointly from the borehole and seismic measurements.

Figure 5:
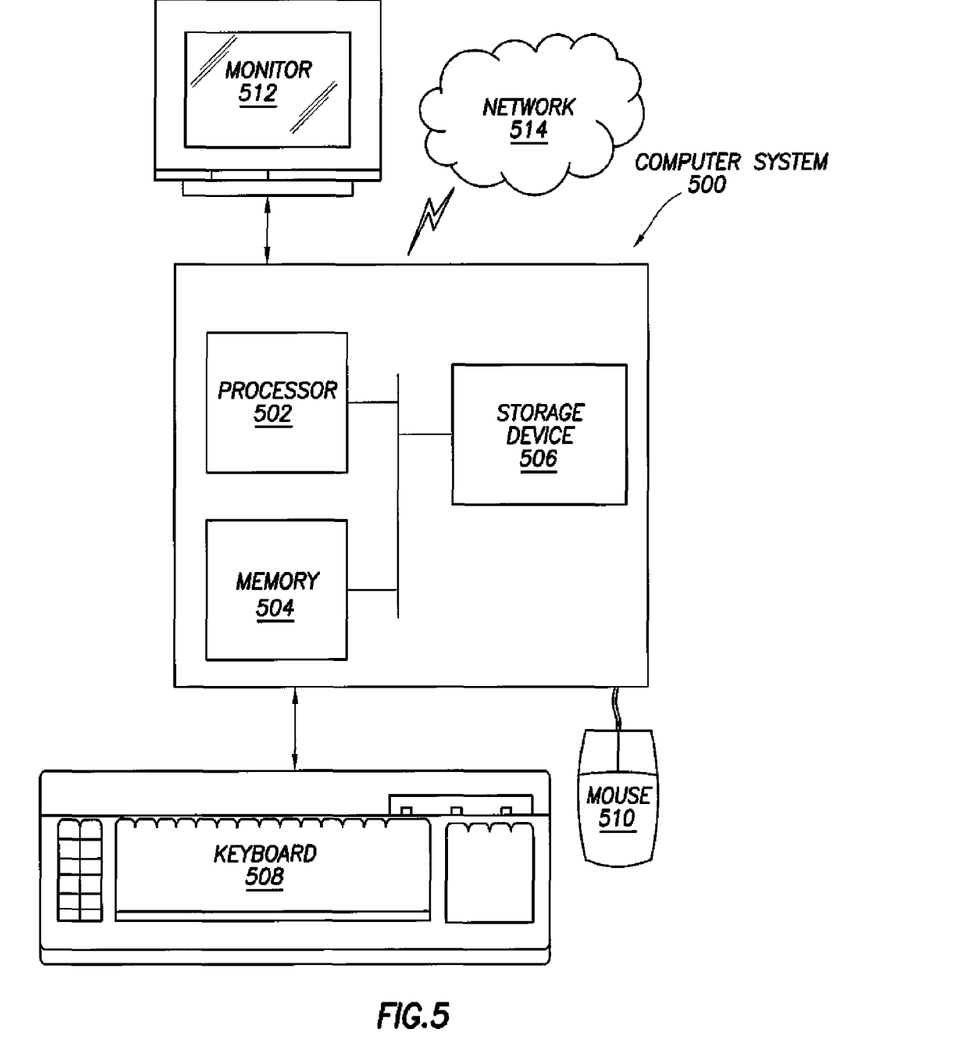
FIG. 5 depicts a computer system in which one or more embodiments of joint structural dip removal may be implemented.

Embodiments of joint structural dip removal may be implemented on virtually any type of computer regardless of the platform being used. For instance, as depicted in FIG. 5, a computer system (500) includes one or more processor(s) (502) such as a central processing unit (CPU) or other hardware processor, associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer (500) may also include input means, such as a keyboard (508), a mouse (510), or a microphone (not shown). Further, the computer (500) may include output means, such as a monitor (512) (e.g., a liquid crystal display LCD, a plasma display, or cathode ray tube (CRT) monitor). The computer system (500) may be connected to a network (514) (e.g., a local area network (LAN), a wide area network (WAN) such as the Internet, or any other similar type of network) via a network interface connection (not shown). Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means may take other forms, now known or later developed. Generally speaking, the computer system (500) includes at least the minimal processing, input, and/or output means necessary to practice one or more embodiments.

Further, those skilled in the art will appreciate that one or more elements of the aforementioned computer system (500) may be located at a remote location and connected to the other elements over a network. Further, one or more embodiments may be implemented on a distributed system having a plurality of nodes, where each portion of the implementation (e.g., the dip analysis tool, the servers) may be located on a different node within the distributed system. In one or more embodiments, the node corresponds to a computer system. Alternatively, the node may correspond to a processor with associated physical memory. The node may alternatively correspond to a processor with shared memory and/or resources. Further, software instructions to perform one or more embodiments may be stored on a non-transitory computer readable storage medium such as a compact disc (CD), a diskette, a tape, or any other computer readable storage device.

The systems and methods provided relate to the acquisition of hydrocarbons from an oilfield. It will be appreciated that the same systems and methods may be used for performing subsurface operations, such as mining, water retrieval and acquisition of other underground fluids or other geomaterials materials from other fields. Further, portions of the systems and methods may be implemented as software, hardware, firmware, or combinations thereof.

While the invention has been described with respect to a limited number of embodiments, those skilled in the art, having benefit of this disclosure, will appreciate that other embodiments may be devised which do not depart from the scope of joint structural dip removal as disclosed herein. Accordingly, the scope of joint structural dip removal should be limited only by the attached claims.

What is claimed is:

1. A method comprising:
providing a seismic volume for a subterranean formation with respect to a depth domain;
extracting seismic dips from the seismic volume in the depth domain along a borehole trajectory in at least a portion of the subterranean formation;
analyzing a borehole in at least a portion of the subterranean formation using the seismic dips to obtain structural dip data;
providing borehole imagery of at least a portion of the subterranean formation;
analyzing geological features in the borehole imagery to obtain borehole dips;

in response to determining that the seismic dips and borehole dips are consistent, generating a three dimensional ("3D") structural model of at least a portion of the subterranean formation using the structural dip data;

performing a structural restoration using the 3D structural model and a processor to obtain depositional geometry data;

removing structural dip from the borehole imagery using the 3D structural model to obtain sedimentary dip data; and performing a stratigraphic interpretation of stratigraphy associated with at least a portion of the subterranean formation using the depositional geometry data and the sedimentary dip data.

2. The method of claim 1, further comprising:
generating a field plan for performing a field operation at a well site based on the stratigraphic interpretation.

3. The method of claim 1, wherein analyzing to obtain the structural dip data further comprises:
filtering the seismic dips based on dip sequence consistency;
extracting structural dip information relevant for a structural dip computation from the dip sequence consistency; and
defining constant structural dip zones based on interactions between tadpole plots and a stereo-net display of the structural dip information.

4. The method of claim 1, wherein determining that the seismic dips and borehole dips are consistent further comprises:
extracting the borehole dips from the borehole imagery;
determining that the seismic dips and borehole dips are consistent;
generating a structural dip zonation based on the borehole dips and the seismic dips, wherein the structural dip zonation comprises a portion of the borehole dips and the seismic dips sharing a common dip attribute;
generating structural boundaries based on the borehole dips and the seismic dips; and
determining that the structural boundaries and structural dip zonation are consistent.

5. The method of claim 1, wherein the seismic dips are extracted using one of a group consisting of volume attribute processing and measurements of extracted surfaces from the seismic volume along the borehole trajectory.

6. The method of claim 1, wherein the seismic volume is converted to the depth domain using a velocity model, and wherein the velocity model is revised in response to determining that the seismic dips and borehole dips obtained from the borehole imagery are inconsistent.

7. The method of claim 6, wherein the velocity model is revised by validating the velocity model against the borehole dips obtained from the borehole imagery and the seismic dips from the seismic volume, wherein the borehole dips and the seismic dips have a different scale of investigation.

8. The method of claim 1, wherein at each step of the structural restoration, resulting structural model surfaces are verified using a corresponding removal step of the removing structural dip.

9. A system for structural dip removal, comprising:
a dip analysis tool comprising a processor and a memory, the memory comprising software instructions for enabling the processor to:
convert seismic data to a depth domain;
extract seismic dips from the seismic data in the depth domain along a borehole trajectory;
analyze a borehole using the seismic dips to obtain structural dip data;
access borehole imagery;
analyze geological features in the borehole imagery to obtain borehole dips;
in response to determining that the seismic dips and borehole dips are consistent, generate a three dimensional ("3D") structural model using the structural dip data;
perform a structural restoration using the 3D structural model to generate depositional geometry data;
remove structural dip from the borehole imagery using the 3D structural model to generate sedimentary dip data, wherein at each step of the structural restoration, resulting structural model surfaces are verified using a corresponding removal step of the removing structural dip; and
perform a stratigraphic interpretation using the depositional geometry data and the sedimentary dip data.

10. The system of claim 9, further comprising:
a surface unit configured to generate a field plan for performing a field operation at a well site based on the stratigraphic interpretation.

11. The system of claim 9, wherein to analyze to obtain the structural dip data further comprises:
filtering the seismic dips based on dip sequence consistency;
extracting structural dip information relevant for a structural dip computation from the dip sequence consistency; and
defining constant structural dip zones based on interactions between tadpole plots and a stereo-net display of the structural dip information.

12. The system of claim 9, wherein determining that the seismic dips and borehole dips are consistent further comprises:
extracting the borehole dips from the borehole image;
determining that the seismic dips and borehole dips are consistent;
generating a structural dip zonation based on the borehole dips and the seismic dips, wherein the structural dip zonation comprises a portion of the borehole dips and the seismic dips sharing a common dip attribute;
generating structural boundaries based on the borehole dips and the seismic dips; and
determining that the structural boundaries and structural dip zonation are consistent.

13. The system of claim 9, wherein the seismic dips are extracted using one of a group consisting of volume attribute processing and measurements of extracted surfaces from the seismic data along the borehole trajectory.

14. The system of claim 9, wherein the seismic data is converted to the depth domain using a velocity model, and wherein the velocity model is revised in response to determining that the seismic dips and borehole dips obtained from the borehole imagery are inconsistent.

15. The system of claim 14, wherein the velocity model is revised by validating the velocity model against the borehole dips obtained from the borehole imagery and the seismic dips obtained from the seismic data, wherein the borehole dips and the seismic dips have a different scale of investigation.

16. A non-transitory computer readable storage medium storing instructions for structural dip removal, the instructions when executed causing a processor to perform:
converting a seismic volume to a depth domain;
extracting seismic dips from the seismic volume in the depth domain along a borehole trajectory;

analyzing a borehole using the seismic dips to obtain structural dip data;

accessing borehole imagery;

analyzing geological features in the borehole imagery to obtain borehole dips;

in response to determining that the seismic dips and borehole dips obtained from borehole imagery are consistent, generating a three dimensional ("3D") structural model using the structural dip data, wherein the borehole dips and the seismic dips have a different scale of investigation;

performing a structural restoration using the 3D structural model to generate depositional geometry data;

removing structural dip from the borehole imagery using the 3D structural model to generate sedimentary dip data; and performing a stratigraphic interpretation using the depositional geometry data and the sedimentary dip data.

17. The non-transitory computer readable storage medium of claim 16, wherein analyzing to obtain the structural dip data further comprises:

filtering the seismic dips based on dip sequence consistency;

extracting structural dip information relevant for a structural dip computation from the dip sequence consistency; and defining constant structural dip zones based on interactions between tadpole plots and a stereo-net display of the structural dip information.

18. The non-transitory computer readable storage medium of claim 16, wherein determining that the seismic dips and borehole dips are consistent further comprises:

extracting the borehole dips from the borehole image;

determining that the seismic dips and borehole dips are consistent;

generating a structural dip zonation based on the borehole dips and the seismic dips, wherein the structural dip zonation comprises a portion of the borehole dips and the seismic dips sharing a common dip attribute;

generating structural boundaries based on the borehole dips and the seismic dips; and determining that the structural boundaries and structural dip zonation are consistent.

19. The non-transitory computer readable storage medium of claim 16, wherein the seismic volume is converted to the depth domain using a velocity model, and wherein the velocity model is revised in response to determining that the seismic dips and borehole dips obtained from the borehole imagery are inconsistent, and wherein the velocity model is revised by validating the velocity model against the borehole dips obtained from the borehole imagery and the seismic dips from the seismic volume.

20. The non-transitory computer readable storage medium of claim 16, wherein at each step of the structural restoration, resulting structural model surfaces are verified using a corresponding removal step of the removing structural dip.

\* \* \* \* \*